M. H. CLEAVER.
COMBINED NON-SKID AND TRACTION DEVICE FOR DUAL TIRED WHEELS.
APPLICATION FILED JUNE 28, 1915.
1,182,647.
Patented May 9, 1916.
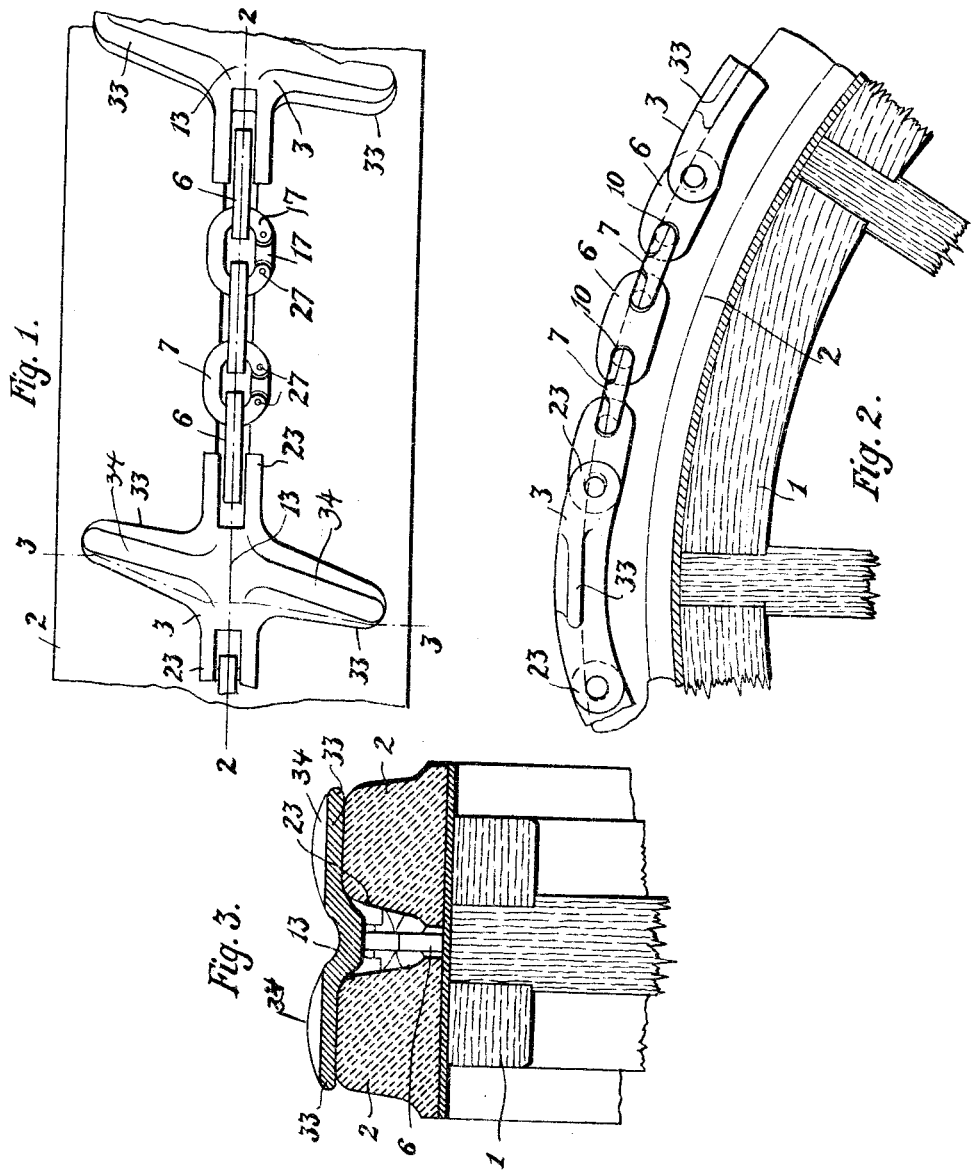
INVENTOR
Montague H. Cleaver
BY
ATTORNEY

UNITED STATES PATENT OFFICE.

MONTAGUE H. CLEAVER, OF NEW YORK, N. Y., ASSIGNOR TO NEVERSKID MANUFACTURING CO., INCORPORATED, A CORPORATION OF NEW YORK.

COMBINED NON-SKID AND TRACTION DEVICE FOR DUAL-TIRED WHEELS.

1,182,647.  Specification of Letters Patent.  Patented May 9, 1916.

Original application filed December 21, 1914, Serial No. 878,439. Divided and this application filed June 26, 1915. Serial No. 36,725.

*To all whom it may concern:*

Be it known that I, MONTAGUE H. CLEAVER, a subject of the King of Great Britain, residing at New York city, county and State of New York, have invented certain new and useful Improvements in Combined Non-Skid and Traction Devices for Dual-Tired Wheels, of which the following is a specification.

My invention relates to non-skid and traction devices for vehicles such as heavy motor trucks having wheels provided with dual elastic tires, and has for its object the production of a device of this character which will not slip on the surface of the tires, nor on the roadbed, and which will produce only a minimum of uneven or chattering action when the vehicle provided with the device runs over a solid pavement.

This application constitutes a division of my prior application Serial No. 878,439, filed December 21, 1914, and subsequently issued as Patent No. 1,160,577 dated November 16, 1915.

The best form of apparatus at present known to me embodying my invention is illustrated in the accompanying sheet of drawings, in which—

Figure 1 is a plan view of a section of the wheel face with one form of my invention applied thereto. Fig. 2 is a vertical section of the wheel taken on line 2—2 of Fig. 1, the non-skid device being shown in full lines, with parts broken away. Fig. 3 is a cross section taken on the irregular line 3—3 of Fig. 1.

Throughout the drawings like reference characters indicate like parts.

1, is the wheel provided with dual elastic tires 2, 2, usually made of hard rubber.

The non-skid device consists of a series of shoes held together by flexible chains and having extensions or wings, which overlie the faces of the elastic tires, the connecting chains lying in the groove between the tires. The shoe 3, has diagonally extending wings 33, 33, which overlie the faces of the tires 2, 2. The central portion of the shoe has a depressed or grooved part 13, and projecting ears 23, 23, to which the chain sections may be connected.

While any desired form of flexible connecting means may be employed, I have shown a series of flat links 6, 6, alternating with a series of split links 7, 7, composed of sections 17, 17, riveted together at 27, 27. The flat links have holes 10, 10, punched, one near each end, through which the adjoining links may pass.

The main body or base of each wing 33, is composed of a flat, elongated, plate-like formation adapted to rest on the surfaces of the tires and provided with external, raised ribs 24, which run lengthwise of the wings. The inner ends of the ribs on the opposite wings are separated by an external groove 13 which runs transversely to the ribs and wings, extending from one pair of lugs 23, at one end of the shoe to the opposite pair of lugs 23, at the other end of the shoe. Thus the spaces between the lugs of each pair form extensions of the before mentioned grooves. Preferably, also the two ribs on each shoe are out of line one with the other, as shown in Fig. 1. This brings their inner ends opposite, so that one goes into engagement with the roadbed before the other has gone out of engagement.

The making of the central portion of each shoe in the shape of a depressed groove reduces the liability of the shoes being hammered between the solid portion of the wheel rim located between the tires, and the pavement, or any projection from the pavement. It throws the entire weight upon the wings of the shoe which overlie the faces of the elastic tires so that the entire weight is carried where it should be carried, *i. e.* by said elastic tires.

Having described my invention, I claim:

1. A non-skid traction device for wheels provided with dual elastic tires having in combination a series of shoes provided with oppositely extending wings comprising flat, elongated plate-like formations adapted to rest on the surfaces of the tires and provided with external, raised ribs extending lengthwise thereof, the inner ends of said ribs being separated by an exterior groove extending transversely thereto, pairs of parallel lugs extending from either side of each shoe so located that the spaces between the lugs of each pair form extensions of the before mentioned groove, whereby a continuous exterior groove is formed in the series of shoes in line with the groove between the dual elastic tires, and connecting members pivoted between said lugs.

2. A non-skid traction device for wheels provided with dual elastic tires having in combination a series of shoes provided with oppositely extending wings comprising flat, elongated plate-like formations adapted to rest on the surfaces of the tires and provided with external, raised ribs extending lengthwise thereof, the inner ends of said ribs being separated by an exterior groove extending transversely thereto, pairs of parallel lugs extending from either side of each shoe so located that the spaces between the lugs of each pair form extensions of the before mentioned groove, and connecting members pivoted between said lugs, the two rib portions of each shoe being out of line one with the other.

3. A shoe for use in non-skid devices for wheels provided with dual elastic tires provided with oppositely extending wings comprising flat, elongated plate-like formations adapted to rest on the surfaces of the tires and provided with external, raised ribs extending lengthwise thereof, the inner ends of said ribs being separated by a groove in the exterior surface of the shoe running transversely of the ribs, and pairs of parallel lugs extending from either side of the shoe perforated to serve as attachments to connecting means, said lugs being so located that the spaces between the members of each pair form extensions of the before mentioned groove.

MONTAGUE H. CLEAVER.

Witnesses:
A. PARKER SMITH,
M. G. CRAWFORD.